(12) United States Patent
Sundaram (10) Patent No.: US 10,700,790 B2
(45) Date of Patent: Jun. 30, 2020

(54) OPTICAL DRIVER CIRCUITRY FOR BURST MODE TRANSFER

(71) Applicant: Intel Corporation, Santa Clara, CA (US)

(72) Inventor: Arvind Sundaram, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/326,732

(22) PCT Filed: Sep. 29, 2016

(86) PCT No.: PCT/US2016/054347
§ 371 (c)(1),
(2) Date: Feb. 20, 2019

(87) PCT Pub. No.: WO2018/063218
PCT Pub. Date: Apr. 5, 2018

(65) Prior Publication Data
US 2019/0215080 A1 Jul. 11, 2019

(51) Int. Cl.
*H04B 10/40* (2013.01)
*H04B 10/80* (2013.01)
(Continued)

(52) U.S. Cl.
CPC ........... *H04B 10/803* (2013.01); *H04B 10/11* (2013.01); *H04B 10/40* (2013.01); *H04B 10/503* (2013.01); *H04B 10/6911* (2013.01)

(58) Field of Classification Search
CPC .................................................... H04B 10/40
See application file for complete search history.

(56) References Cited

U.S. PATENT DOCUMENTS 6,446,867 B1 * 9/2002 Sanchez ............... G01R 31/002
235/454
6,509,992 B1 * 1/2003 Goodwill ........... H04B 10/1141
398/129

(Continued)

FOREIGN PATENT DOCUMENTS

EP 3073651 A1 9/2016
WO WO-201806328 A1 4/2018

OTHER PUBLICATIONS

"International Application Serial No. PCT/US2016/054347, International Search Report dated May 24, 2017", 5 pgs.

(Continued)

*Primary Examiner* — Nathan M Cors
(74) *Attorney, Agent, or Firm* — Schwegman Lundberg & Woessner, P.A.

(57) ABSTRACT

An apparatus comprises a laser emitter configured to transmit laser energy across an air gap to a separate device, and a driver circuit electrically coupled to the laser emitter and to an electrical interface. The driver circuit is configured to detect voltage levels at the electrical interface including a first voltage level, a second voltage level, and a third voltage level, and drive the laser emitter at a first power level when detecting the first voltage level, drive the laser emitter at a second power level when detecting the second voltage level, and drive the laser emitter at a third power level intermediate the first and second power levels when detecting the third voltage level.

19 Claims, 5 Drawing Sheets

(51) Int. Cl.
*H04B 10/11* (2013.01)
*H04B 10/50* (2013.01)
*H04B 10/69* (2013.01)

(56) References Cited

U.S. PATENT DOCUMENTS

| | | |
|---|---|---|
| 2009/0021183 A1 | 1/2009 | Ye et al. |
| 2012/0206056 A1 | 8/2012 | Jung et al. |
| 2013/0038227 A1 | 2/2013 | Yan et al. |
| 2013/0087690 A1 | 4/2013 | Sloey et al. |
| 2014/0269799 A1* | 9/2014 | Ortiz .................... H01S 5/0428 372/38.02 |
| 2019/0250336 A1* | 8/2019 | Guo ................... G02B 6/29361 |

OTHER PUBLICATIONS

"International Application Serial No. PCT/US2016/054347, Written Opinion dated May 24, 2017", 7 pgs.

\* cited by examiner

OPTICAL DRIVER CIRCUITRY FOR BURST MODE TRANSFER

CLAIM OF PRIORITY

This patent application is a U.S. National Stage Application under 35 U.S.C. 371 from International Application No. PCT/US2016/054347, filed Sep. 29, 2016, published as WO2018/063218, which is incorporated herein by reference.

TECHNICAL FIELD

Embodiments pertain to high speed interconnections in electronic systems, and more specifically to optical communication interfaces between electronic devices.

BACKGROUND

Electronic systems often include electronic devices that communicate signals to each other. Designers of electronic systems strive to increase the speed of the communication among devices while keeping the communication link robust. Wireless connections can be more robust than wired connections because of the elimination of the need for mechanical contact that may be susceptible to wear. Wireless interfaces typically communicate using radio frequency (RF) signals. However, some limitations of RF communication interfaces include bandwidth limitations, signal interference, and overhead associated with RF protocols. Optical signals can be an alternative to RF and can achieve higher data rates. However, traditional optical interconnects require special fiber-optic cables, which can be more expensive than wired interfaces, and can require air tight glass-to-glass connections to prevent Fresnel reflections, making them less desirable and, in certain examples, impractical for day-to-day free-air interconnects. There is a general need for devices, systems and methods to address requirements for high-speed interconnections among electronic devices.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

There are many types of communication interfaces between electronic devices. These include universal serial bus (USB), mobile industry processor interface (MIPI), peripheral component interconnect (PCI), PCI express (PCIe), high definition multimedia interface (HDMI), thunderbolt (TBT), display port (DP) interface, and other serial busses and serial-parallel busses used in consumer electronics, enterprise class devices, wearable electronic devices, portable computers, and tablet computers. It is desirable to implement a wireless communication interface that can provide improved data rate and can adapt basic wireless interconnection with all of the protocols available and yet not be tied to any one specific protocol. An infrared-based (IR-based) interface is an alternative to an RF interface, but an IR-based interface involves conversion between protocols, which adds overhead to the communication. A laser-based optical interface would meet these requirements for the interconnection, but the cost of fiber optic based optical interconnections can be prohibitive.

An improvement would be a laser-based optical interface that does not use fiber optics to transmit and receive the laser emitted signals, but instead transmits the optical signals via free air space (e.g., a light amplitude modulation docking adapter, or LAMDA). This can be accomplished by communicating the optical signals over short distances (e.g., about ten millimeters, or 10 mm) so that signal loss is tolerable. The free air optical interface can scale to data rates up to ten gigabits per second (10 Gbps) and rates of one terabit per second (1 Tbps) may be available. This type of optical interface is not tied to any specific protocol and eliminates protocol overhead, which reduces the latency in communication to near zero latency. Further, this type of optical interface is agnostic to clock rate, making the interface compatible with high speed and low speed interfaces.

Figure 1:
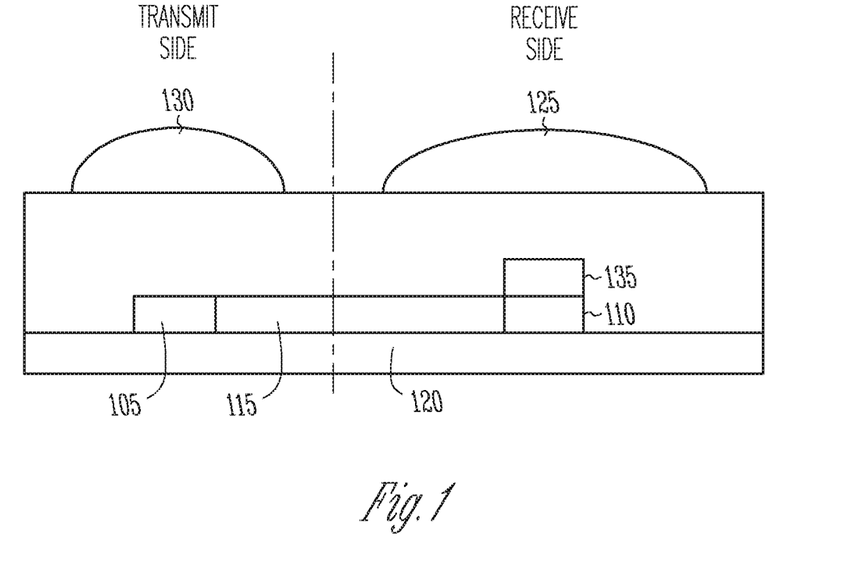
FIG. 1 is an illustration of an optical transmitter (TX) receiver (RX) pair in accordance with some embodiments.

FIG. 1 is an illustration of an embodiment of an optical transmitter (TX) receiver (RX) pair. The optical TX/RX pair can include a laser emitter 105, such as a laser diode or a vertical-cavity surface emitting laser (VCSEL) for example. The optical receiver can include a photodiode 110 to convert received laser energy into an electrical signal. When laser light falls on the photodiode 110, it produces a photo diode current. The current produced is proportional to the amount of laser light incident on the photodiode 110. When the laser light is modulated, the photodiode current varies with the intensity of the incident laser light. Data is received by detecting the laser modulation using the photodiode current.

A trans-impedance amplifier 115 (TIA) can be used to amplify the electrical signals generated by the photodiode 110. In some examples, the TIA provides an average of the photodiode current generated by the photodiode 110. The laser emitter 105, the photodiode 110 and the TIA 115 are arranged on a substrate 120. Some examples of the substrate 120 include a printed circuit board (PCB) made of plastic, plastic laminate (E.g., FR4) or ceramic.

To form a serial duplex optical interface, a second optical TX/RX pair can be positioned opposite the optical TX/RX pair in FIG. 1. The laser emitter of the second optical TX/RX pair is arranged opposite the optical receiver of the first optical TX/RX pair to create a first communication lane, and the laser emitter of the first optical TX/RX pair is arranged opposite the optical receiver of the second TX/RX pair to form a second communication lane in the reverse direction from the first communication lane. An air gap separates the two TX/RX pairs. The separation between the two optical TX/RX pairs is small (e.g., about 2.5 mm). The small separation allows for the receivers to reliably detect the laser energy from the laser emitters. The TX/RX pair can include a lens 125 to focus incident laser energy onto the photodiode 110. The TX/RX pair may also include a second lens 130 to focus the emitted laser energy toward the receiving photodiode across the air gap. The lenses 125, 130 may be epoxy molded lenses.

Figure 2:
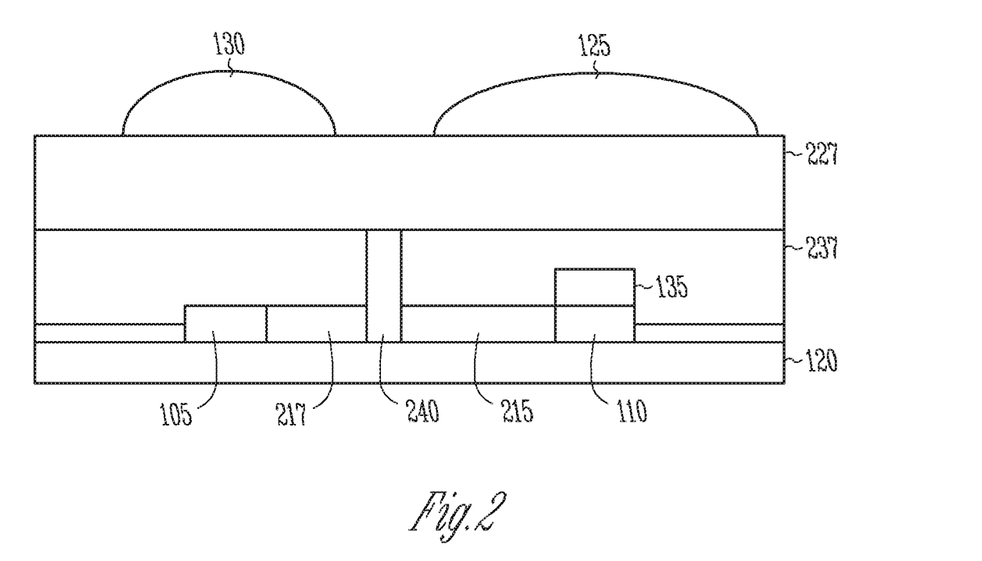
FIG. 2 is an illustration of another optical TX/RX pair in accordance with some embodiments.

FIG. 2 is an illustration of another embodiment of an optical transmitter TX/RX pair. A trans-impedance amplifier 215 (TIA) can be used to amplify the electrical signal generated by the photodiode 110. A drive amplifier 217 may also be included to translate signals to be transmitted to levels of power or voltage needed to drive the laser emitter 105. A resin 237 may be disposed on the substrate to encapsulate the electronics. The resin may be an optically clear resin (OCR) that flows before hardening. However, OCR may be susceptible to scratching. Because the optical interface is exposed to air rather than being protected using connections to fiber-optics, the optical TX/RX pair may need a surface with a higher degree of hardness than a resin can provide.

The optical TX/RX pair includes a lens 227. The lens may have a surface hardness rating of 8 H or higher. The lens 227 can include a first lens portion 125 having a first curvature arranged above the photodiode 110 and a second lens portion 130 having a second curvature arranged above the laser emitter 105. The lens may be pre-formed prior to assembly and may include alumina silicate glass or a co-polymer coated poly(methyl methacrylate) (PMMA), such as sol-gel coated PMMA for example. The lens may have the same refractive index as the OCR to prevent reflections at the OCR/lens interface. The lens may also provide protection from humidity. An isolation barrier 240 may be arranged on the substrate between the laser emitter and the photodiode. The isolation barrier 240 may extend from the substrate to the top surface of the resin and may also serve as a support for the lens during curing of the resin.

In some embodiments, the photodiode 110 has a wide spectral response (e.g., an indium gallium arsenide (InGaAs) photodiode). The wide spectral response is desirable for detection of laser energy transmitted over air, but can cause problems of crosstalk between the two communication lanes. To reduce or eliminate crosstalk between communication lanes, a laser bandpass filter 135 is arranged above the photodiode 110 of each TX/RX pair. In some embodiments, the laser bandpass filter 135 can be a Lyot filter or a dichroic filter arranged above the photodiode 110. In some embodiments, the laser bandpass filter 135 is formed as a coating (e.g., an anti-reflective coating, or ARC) on the photodiode using ion beam sputtering (IBS). In some embodiments, the laser bandpass filter 135 is formed as a coating on the lens 125.

The laser bandpass filter 135 of a TX/RX pair has a passband that excludes the center frequency of the laser energy emitted by the laser emitter 105 of the TX/RX pair, but the passband includes the center frequency of the laser energy emitted by the laser emitter of the communication lane of the photodiode 110. Thus, the laser bandpass filter 135 reduces or eliminates laser energy from one communication lane from being detected by the other communication lane. In some embodiments, the center frequency of a laser emitter is assigned based on whether the laser emitter is included in a host device (e.g., a computing device or a mobile communication device) or a peripheral device (e.g., a disk drive). If a TX/RX pair is included in a host device, the TX/RX pair includes a laser emitter having a first center frequency and a laser bandpass filter that excludes the first center frequency. If a TX/RX pair is included in a peripheral device, the TX/RX pair includes a laser emitter having a second center frequency and a laser bandpass filter that excludes the second center frequency and passes the first center frequency. The TX/RX pair of the host device includes a laser bandpass filter that passes the second center frequency. Thus, the passband of the laser bandpass filter may be selected according to whether the TX/RX pair is included in the host device or peripheral device.

Figure 3:
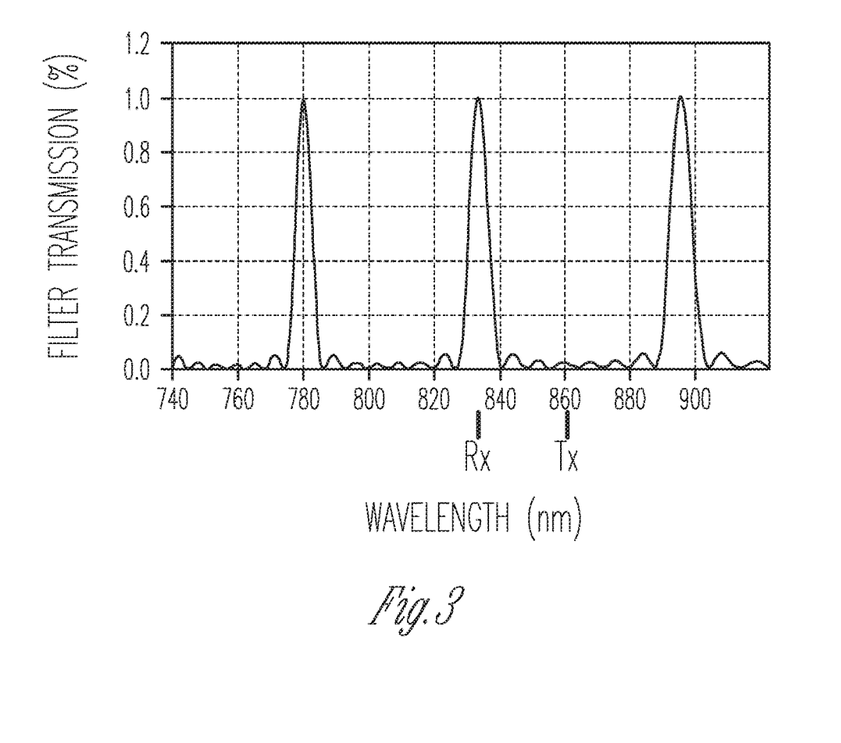
FIG. 3 is an example of a filter characteristic for a laser bandpass filter in accordance with some embodiments.

FIG. 3 is an example of a filter characteristic for a laser bandpass filter. The example is intended to be illustrative and non-limiting. The filter characteristic shows filter transmission versus wavelength. In the example, a host device laser emitter emits laser energy with a wavelength of 855 nanometers (nm), and a peripheral laser emitter emits laser energy with a wavelength of 830 nm. FIG. 3 shows an example of a filter characteristic for the host device. The filter shows very high attenuation at 855 nm and shows that the passband of the filter includes 830 nm.

Figure 4:
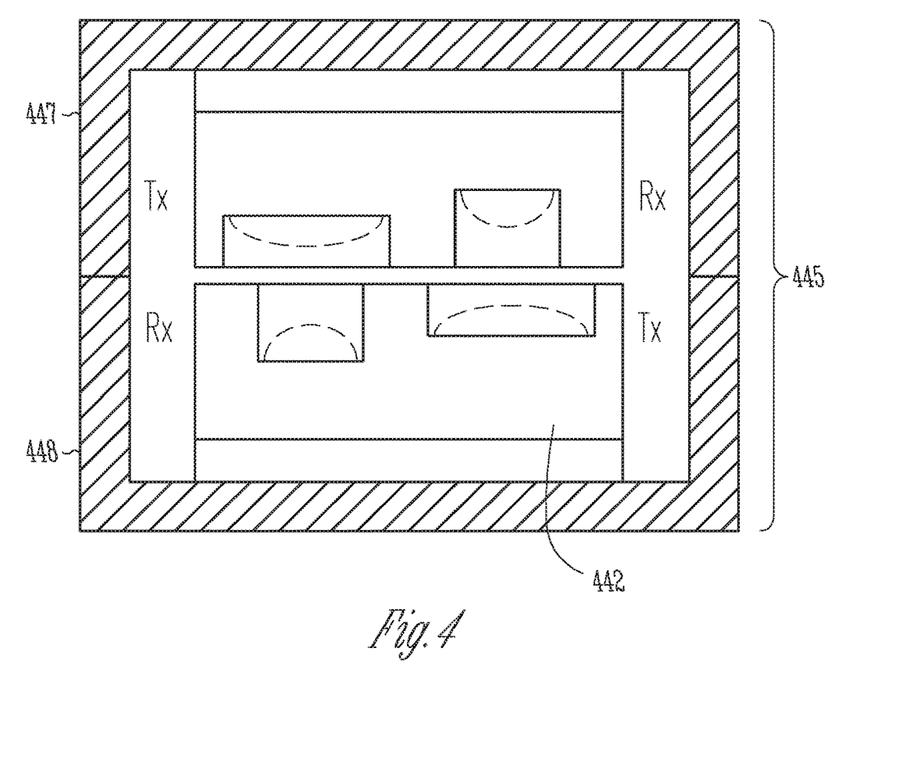
FIG. 4 is an illustration of an arrangement of optical TX/RX pairs in accordance with some embodiments.

FIG. 4 is an illustration of an embodiment of an arrangement between optical TX/RX pairs of the host side of the optical interface and the peripheral side of the optical interface. An optical TX/RX pair may be electrically connected to logic circuitry 442 on the substrate. The logic circuitry 442 transmits and receives signals communicated according to a duplex communication protocol, such as a USB protocol. In certain embodiments, the substrate is an electronics package substrate and the laser emitter, the photodiode, and the logic circuitry 442 may be included in the same electronics package. The optical interface can include a mechanical connector 445 to house the interface and protect against interference from outside sources. The mechanical connector 445 may include first connector body portion 447 and a second connector body portion 448. The optical interface host side can be included in the first connector body portion 447 and the optical interface peripheral side can be included in the second connector body portion 448. Mating the two connector body portions places the TX laser emitters opposite the RX photodiodes across a small air gap or air space to form the communication lanes of the optical interface. Data is sent between devices or between optical links of the optical interface by transmitting laser energy via free air.

Figure 5:
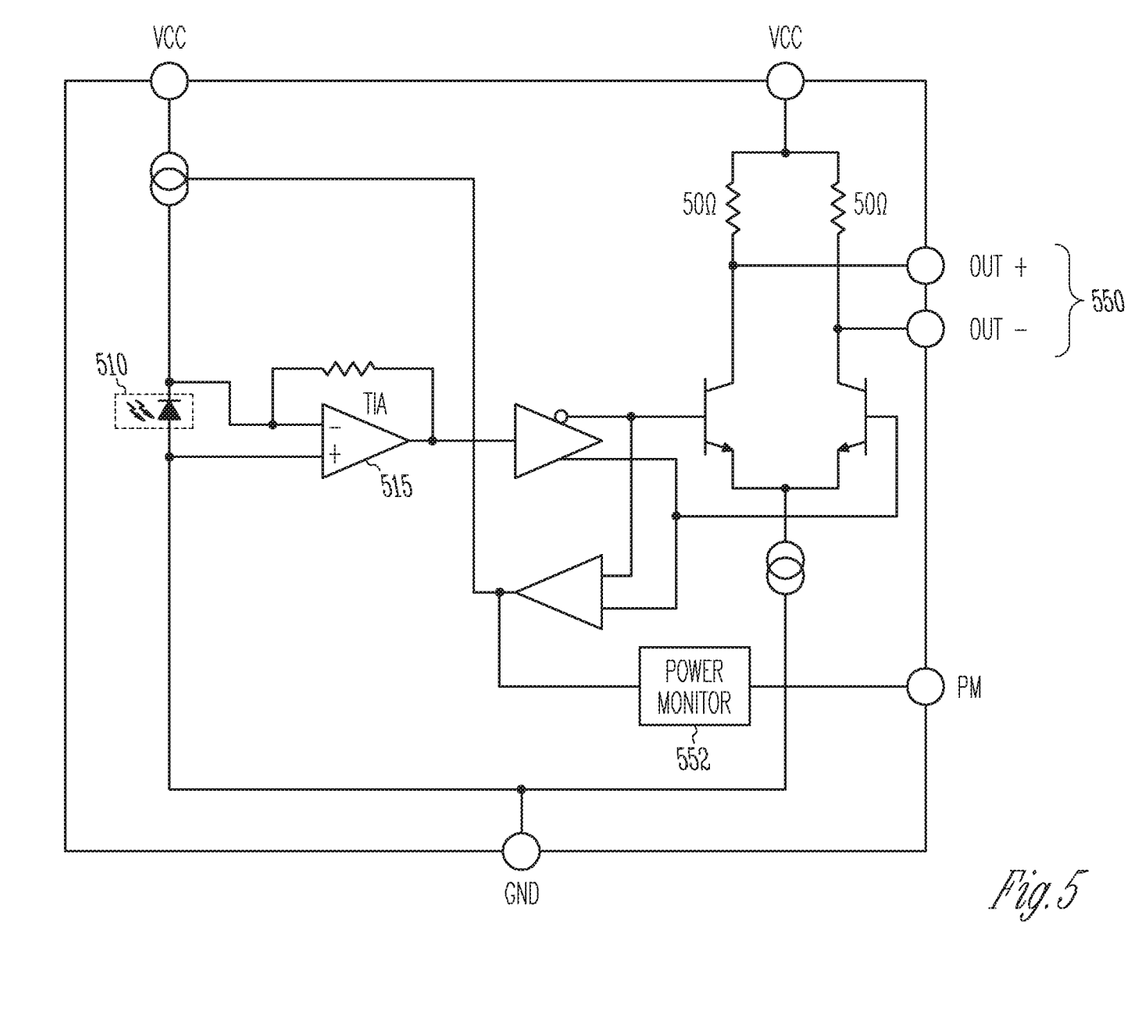
FIG. 5 is a schematic of an embodiment of an optical electronic circuit on the receive side of the optical interface in accordance with some embodiments.

FIG. 5 is a schematic of an embodiment of an optical electronic circuit on the RX side of the optical interface. The receiver circuit includes a photodiode 510 and a TIA 515. The optical electronic circuit receives optical data of ones and zeros and translates the optical data to electrical data. A differential output 550 may be electrically coupled to logic circuitry that provides the electrical data to a processor according to a bus protocol (e.g., a USB protocol).

To detect a '1' or '0' in the optical data, the receiver circuit may calculate an average power of incident laser energy, such as by using a power monitor circuit 552. This may involve calculating a moving average of the peaks and valleys of the power of laser energy detected on the optical interface. A logic '1' may be detected when incident laser energy exceeds the calculated average power and a logic '0' may be detected when incident laser energy is less than the calculated average power. A complication arises if the optical electronics of the RX side needs to recalculate the average power level. The average power level may change for example when the cable length is changed. In this situation, the optical electronics of the RX side may need to recalibrate or recalculate the average power level. The average power level may also have to be recalibrated or recalculated when the interface has an error such as when an input clock synchronization is lost.

This recalibration or recalculation by the optical electronics of the RX side takes a certain amount of time to determine average power and to set up the average power level for data identification. Some bus protocols (e.g., the USB protocol) use burst modes to save power. In a burst mode, a "burst" of a predetermined amount of data is communicated followed by a period of electrical idle of the interface. Simply running the optical interface in a burst mode would require recalculation of the average power level for every burst due to the loss of the correct average power level between bursts. Because the recalibration takes a non-negligible amount of time, communicating in a burst mode would likely cause the optical interface to fail due to the latency in setting up the average power level.

Figure 6:
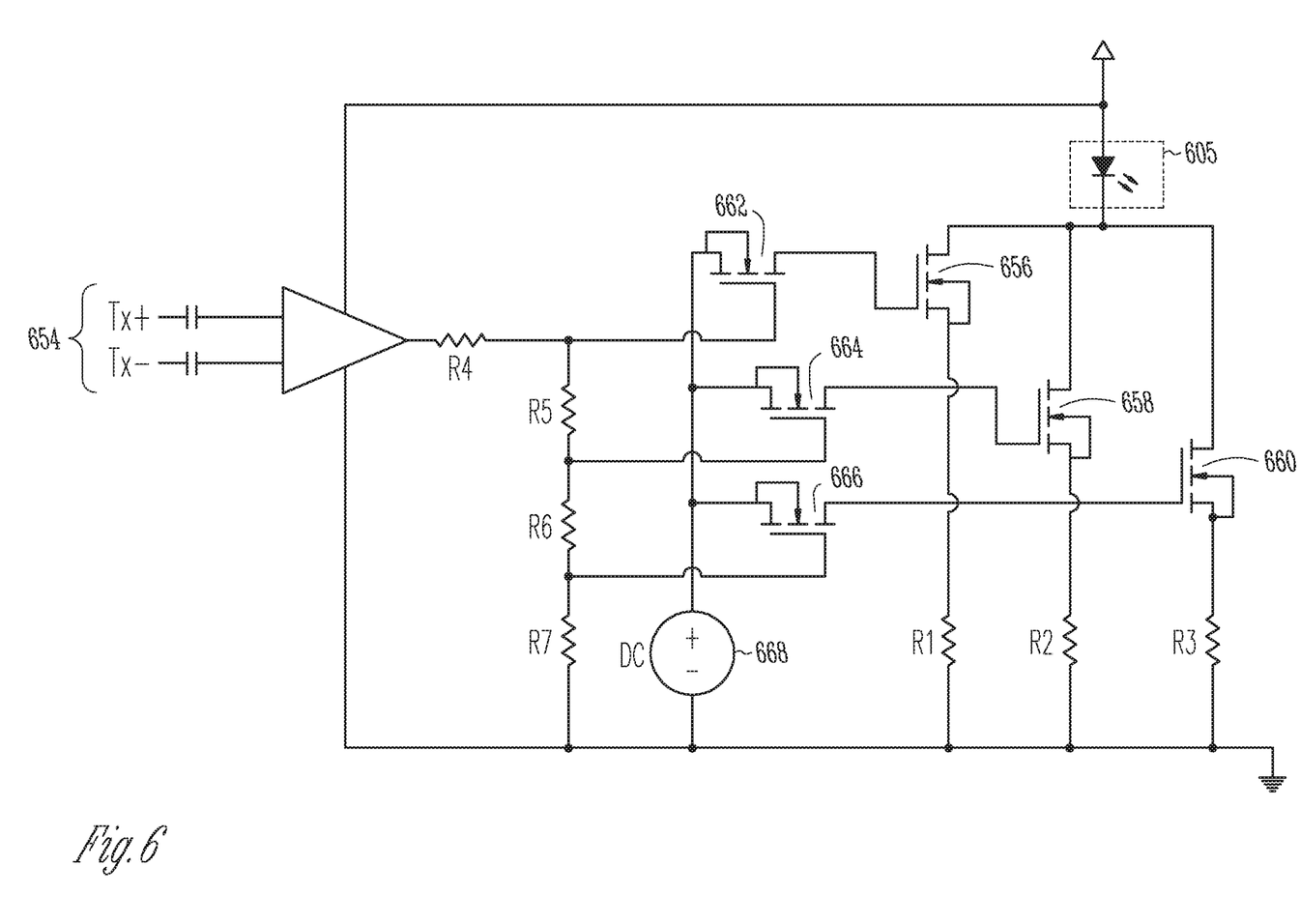
FIG. 6 is a schematic of an embodiment of an optical electronic circuit on the transmit side of the optical interface in accordance with some embodiments.

FIG. 6 is a schematic of an embodiment of an optical electronic circuit on the TX side of the optical interface. The TX circuit includes a laser emitter 605 and a driver circuit. The driver circuit is electrically coupled to the laser emitter 605 and an electrical interface 654. The driver circuit detects voltage levels at the electrical interface and drives the laser emitter with power levels determined according to the detected voltage levels. In the embodiment of FIG. 6, the driver circuit includes a resistive divider circuit and multiple current sink circuits or current sinks. Field effect transistors 656, 658, and 659 and resistors R1, R2, and R3 are connected as the current sinks, and the resistive divider circuit includes resistors R4 through R7. In certain embodiments, FETs 656, 658, and 660 are high electron mobility transistors (HEMTs). The driver circuit also includes FETs 662, 664, and 666 connected between the resistive divider and the current sinks.

The voltage at the electrical interface is applied to the resistive divider circuit. Depending on the voltage level, one or more of FETs 662, 664, and 666 are activated. This activates one or more of the current sinks which applies bias voltage 668 to the gates of one or more of FETs 656, 658, 660. Activating one or more of the current sinks applies one of three levels of current to the laser emitter to drive the laser emitter with one of three power levels. For example, the highest voltage level activates all of FETs 662, 664, and 666, which applies the bias voltage to the gates of all of FETs 656, 658, and 660, which turns on three of the current sinks. If each of the current sinks applies ten milliamps (10 mA) of current to the laser emitter, the laser emitter is driven with 30 mA for the high voltage level. A low voltage level activates only FET 662 and the bias voltage is only applied to FET 656 to turn on only one current sink. In this case, the laser emitter is only driven with 10 mA. The laser emitter 605 is driven with the lowest power level when the electrical interface is at the low voltage level and is driven with the highest power level when the voltage at the electrical interface is at the highest voltage level.

The high voltage level can correspond to a logic high or logic '1' at the electrical interface, and the low voltage can correspond to logic low or logic '0' at the electrical interface. In this way, a receiver circuit such as the receiver circuit of FIG. 5 can detect logic levels by the difference in the intensity of the laser energy received from the laser emitter. Alternatively, the high voltage level can correspond to a logic '0' and the low voltage level can correspond to a logic '1'.

A third voltage level can be applied to the resistive divider that is intermediate to or halfway in between the high voltage level and the low voltage level. This voltage level activates FETs 662 and 664 in FIG. 6, and FET 666 is off.

The bias voltage is applied to FETs 656 and 658 to turn on two of the current sinks. In the example where each of the current sinks is 10 mA, the third voltage causes 20 mA to be applied to the laser emitter 605. This third voltage level then drives the laser emitter at a third power level that is intermediate the high and low power levels. Logic '1' and logic '0' can be detected by a change in laser intensity from the intermediate laser intensity of the intermediate power level. If the third voltage level corresponds to an idle state of the electrical interface, this third power state will correspond to the average power of the laser emitter 605, and this will be the average power determined by the power monitor circuit 552 of the receiver circuit of FIG. 5. This average power doesn't depend on the toggling of the laser intensity between logic levels. The average power may be determined by the receiver circuit at start-up and remain unchanged.

In some embodiments, the electrical interface 654 is a differential interface to a USB. When the optical interface is used to communicate data according to a USB burst mode protocol, the laser emitter will remain at the average power between burst modes because the average power corresponds to the idle state. Therefore, the latency from recalculating average power at the receiver circuit is removed, and the burst mode will not cause the optical interface to fail.

As explained previously herein in regard to FIG. 4, a first RX/TX pair can be arranged opposite a second RX/TX pair to form a communication lane. The TX laser emitters are arranged opposite the RX photodiodes across the air gap or air space of the optical interface. Each RX/TX pair can include the receiver circuitry and the driver circuitry. The receiver circuitry and the driver circuitry may be included on the same substrate as the photodiodes and laser emitters or can be packaged separately. The communication lane allows for communication of data in both directions to provide duplex communication across the optical interface. The optical interface can be transparent to a processor on either side of the optical interface. The processor may communicate data according to a duplex communication protocol for an electrical interface and does not need to change any timing of the protocol to allow for the optical interface. Notably, the optical interface is independent of clock rate and is limited only by the driver and receiver circuitry. Date rates of ten gigabits per second (10 Gbps) are possible.

The free air optical interface can be included in a personal computer (PC) or a mobile computing device such as a smart phone, tablet, compute stick, etc. The optical interface can be used to connect peripheral devices to the PC or mobile computing device. The optical interface can be included in a server, mini-server, or micro-server, and can be used for agnostic backplane connections to servers. The optical interface can be included in ultra-small or wearable devices where typical mechanical interconnections may be too bulky.

Figure 7:
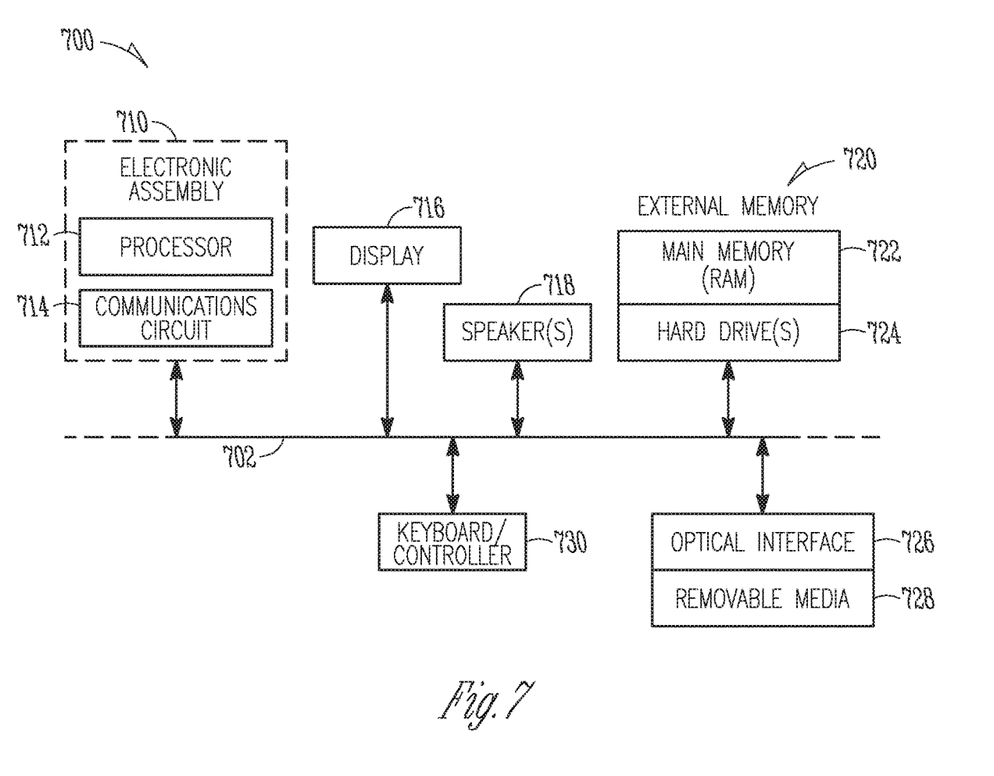
FIG. 7 is a block diagram of an example of an electronic system in accordance with some embodiments.

FIG. 7 is a block diagram of an example of an electronic system 700 incorporating at least one electronic circuit assembly and in accordance with at least one embodiment of the invention. Electronic system 700 is merely one example in which embodiments of the present invention can be used. Examples of electronic systems include, but are not limited to personal computers, tablet computers, mobile telephones, game devices, compute sticks etc. In this example, electronic system 700 comprises a data processing system that includes a system bus 702 to couple the various components of the system. System bus 702 provides communications links among the various components of the electronic system 700 and can be implemented as a single bus, as a combination of busses, or in any other suitable manner.

An electronic assembly 710 can be coupled to system bus 702. The electronic assembly 710 can include any circuit or combination of circuits. In one embodiment, the electronic assembly 710 includes a processor circuit 712 which can be of any type. As used herein, "processor" circuit means any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, or any other type of processor or processing circuit.

Other types of circuits that can be included in electronic assembly 710 are a custom circuit, an application-specific integrated circuit (ASIC), or the like. The electronic assembly can include a communications circuit 714 for use in wireless devices like mobile telephones, personal data assistants, portable computers, two-way radios, and similar electronic systems.

The electronic system 700 can also include an external memory 720, which in turn can include one or more memory elements suitable to the particular application, such as a main memory 722 in the form of random access memory (RAM), one or more hard drives 724. The electronic assembly 710 can also include a free air optical interface 726 for removable media 728 such as compact disks (CD), flash memory cards, digital video disk (DVD), and the like. The electronic assembly 710 and processor 712 may be included in a host device and the removable media 728 may be included in a peripheral device.

The electronic system 700 can also include a display device 716, one or more speakers 718, and a keyboard and/or controller 730, which can include a mouse, trackball, touch screen, voice-recognition device, or any other device that permits a system user to input information into and receive information from the electronic system 700.

ADDITIONAL DESCRIPTION AND EXAMPLES

Example 1 includes subject matter (such as an apparatus) comprising: a laser emitter configured to transmit laser energy across an air gap to a separate device; a driver circuit electrically coupled to the laser emitter and to an electrical interface. The driver circuit is configured to: detect voltage levels at the electrical interface including a first voltage level, a second voltage level, and a third voltage level; and drive the laser emitter at a first power level when detecting the first voltage level, drive the laser emitter at a second power level when detecting the second voltage level, and drive the laser emitter at a third power level intermediate the first and second power levels when detecting the third voltage level.

In Example 2, the subject matter of Example 1 optionally includes an electrical interface that is an interface to a signal bus, and the first voltage level corresponds to a first logic level of the signal bus, the second voltage level corresponds to a second logic level of the signal bus, and the third voltage level corresponds to an idle state of the signal bus.

In Example 3, the subject matter of one or both of Examples 1 and 2 optionally includes the electrical interface being a differential interface to a universal serial bus (USB).

In Example 4, the subject matter of one or any combination of Examples 1-3 optionally includes a driver circuit configured to drive the laser emitter with a first current level when detecting the first voltage, drive the laser emitter with a second current level when detecting the second voltage, and drive the laser emitter with a third current level when detecting the third voltage, wherein the third current level is intermediate the first and second current levels.

In Example 5, the subject matter of Example 4 optionally includes a first field effect transistor (FET), a second FET, and a third FET, wherein driver circuit is configured to: activate the first, second, and third FETs when detecting the first voltage level to sink the first current level from the laser emitter; activate only the first FET when detecting the second voltage level to sink the second current level from the laser emitter; and activate the first and second FETs when detecting the third voltage level to sink the third current level from the laser emitter.

In Example 6, the subject matter of Example of one or any combination of Examples 1-5 optionally includes a photodiode configured to detect laser energy received across the air gap from the separate device, wherein the laser emitter and the photodiode are arranged on a single substrate.

In Example 7, the subject matter of Example 6 optionally includes a receiver circuit electrically coupled to the photodiode, wherein the receiver circuit includes a power monitor circuit configured to determine an average power of laser energy received across the air gap from the separate device, and generate an output voltage using a comparison of received laser energy to the determined average power of laser energy.

In Example 8, the subject matter of one or both of Example 6 and Example 7 optionally includes a processor circuit configured to communicate data with the separate device according to a USB protocol using the photodiode and laser emitter.

In Example 9, the subject matter of Example 8 optionally includes a processor circuit configured to communicate data with the separate device according to a USB burst mode protocol using the photodiode and laser emitter, wherein the driver circuitry is configured to maintain the laser emitter at the third power level between bursts of data transmitted according to the USB burst mode protocol.

Example 10 includes subject matter (such as an apparatus), or can optionally be combined with one or any combination of Examples 1-9 to include such subject matter comprising an optical interface, the optical interface including: an optical interface host side including a host-side laser emitter and host-side driver circuitry, wherein the host-side driver circuitry includes an electrical interface and is configured to detect voltage levels at the electrical interface including a first voltage level, a second voltage level, and a third voltage level; and drive the laser emitter at a first power level when detecting the first voltage level, drive the laser emitter at a second power level when detecting the second voltage level, and drive the laser emitter at a third power level intermediate the first and second power levels when detecting the third voltage level; and an optical interface peripheral side separated from the optical interface host side by an air space, the optical interface peripheral side including a peripheral-side photodiode and peripheral-side receiver circuitry, wherein the peripheral-side receiver circuitry includes a power monitor circuit configured to determine an average power of laser energy received across the air gap from the separate device, and generate an output voltage using a comparison of received laser energy to the determined average power of laser energy.

In Example 11, the subject matter of claim 10 optionally includes a peripheral-side laser emitter; peripheral-side driver circuitry; a host-side photodiode; and host-side receiver circuitry; wherein the host-side photodiode and host-side laser emitter are arranged on a first substrate and the peripheral-side photodiode and peripheral-side laser emitter are arranged on a second substrate.

In Example 12, the subject matter of Example 11 optionally includes a host processor circuit electrically coupled to the optical interface host side, wherein the processor circuit is configured to initiate transmission of pulses of laser energy by the host-side laser emitter according to a duplex communication protocol.

In Example 13, the subject matter of one or any combination of Examples 10-12 optionally includes an electrical interface of the host-side driver circuitry that is an interface to a signal bus, and the first voltage level corresponds to a first logic level of the signal bus, the second voltage level corresponds to a second logic level of the signal bus, and the third voltage level corresponds to an idle state of the signal bus.

In Example 14, the subject matter of one or any combination of Examples 10-13 optionally includes the electrical interface that is a differential interface to a universal serial bus (USB).

In Example 15, the subject matter of one or any combination of Examples 10-14 optionally includes host-side driver circuitry configured to drive the laser emitter with a first current level when detecting the first voltage, drive the laser emitter with a second current level when detecting the second voltage, and drive the laser emitter with a third current level when detecting the third voltage, wherein the third current level is intermediate the first and second current levels.

In Example 16, the subject matter of one or any combination of Examples 10-15 optionally includes host-side driver circuitry that includes a first field effect transistor (FET), a second FET, and a third FET, and the driver circuitry is configured to: activate the first, second, and third FETs when detecting the first voltage level to sink the first current level from the laser emitter; activate only the first FET when detecting the second voltage level to sink the second current level from the laser emitter; and activate the first and second FETs when detecting the third voltage level to sink the third current level from the laser emitter.

Example 17 can include subject matter (such as a method of operating an optical interface, a means for performing acts, or a machine-readable medium including instructions that, when performed by the machine, cause the machine to perform acts), or can be combined with one or any combination of Examples 1-16 to include such subject matter comprising: detecting voltage levels at an electrical bus interface of a first device, the voltage levels including a first voltage level, a second voltage level, and a third voltage level; wherein the first voltage level corresponds to a first logic level of the signal bus, the second voltage level corresponds to a second logic level of the signal bus, and the third voltage level corresponds to an idle state of the signal bus; and transmitting laser energy using an optical interface of the first device across an air gap to a second device, wherein the transmitting includes driving a laser emitter at a first power level when detecting the first voltage level, driving the laser emitter at a second power level when detecting the second voltage level, and driving the laser emitter at a third power level intermediate the first and second power levels when detecting the third voltage level.

In Example 18, the subject matter of Example 17 optionally includes detecting transmitted laser energy at the second device; determining average power level of the detected laser energy; determining a logic level of subsequently detected laser energy by comparing a power level of the subsequently detected laser energy to the determined average power; and generating an output voltage at the second device according to the determined logic level.

In Example 19, the subject matter of one or both of Examples 17 and 18 optionally includes detecting voltage levels includes detecting differential voltage levels at a universal serial bus (USB) interface of the first device.

In Example 20, the subject matter of Example 19 optionally includes transmitting the laser energy according to a USB protocol burst mode.

Example 21 includes subject matter (such as an apparatus), or can optionally be combined with one or any combination of Examples 1-20 to include such subject matter comprising: means for detecting voltage levels at an electrical bus interface of a first device, the voltage levels including a first voltage level, a second voltage level, and a third voltage level; wherein the first voltage level corresponds to a first logic level of the signal bus, the second voltage level corresponds to a second logic level of the signal bus, and the third voltage level corresponds to an idle state of the signal bus; and means for transmitting laser energy using an optical interface of the first device across an air gap to a second device, including transmitting laser energy at a first power level when detecting the first voltage level, transmitting laser energy at a second power level when detecting the second voltage level, and transmitting laser energy at a third power level intermediate the first and second power levels when detecting the third voltage level.

In Example 22, the subject matter or Example 21 optionally includes means for detecting transmitted laser energy at the second device; means for determining average power level of the detected laser energy; means for determining a logic level of subsequently detected laser energy by comparing a power level of the subsequently detected laser energy to the determined average power; and means for generating an output voltage at the second device according to the determined logic level.

These several non-limiting embodiments and examples can be combined using any permutation or combination. The Abstract is provided to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus comprising:
   a laser emitter configured to transmit laser energy across an air gap to a separate device;
   a driver circuit electrically coupled to the laser emitter and to an electrical interface, wherein the driver circuit is configured to:
   detect voltage levels at the electrical interface including a first voltage level, a second voltage level, and a third voltage level; and
   drive the laser emitter at a first power level when detecting the first voltage level, drive the laser emitter at a second power level when detecting the second voltage level, and drive the laser emitter at a third power level intermediate the first and second power levels when detecting the third voltage level, wherein the electrical interface is an interface to a signal bus, and the first voltage level corresponds to a first logic level of the signal bus, the second voltage level corresponds to a second logic level of the signal bus, and the third voltage level corresponds to an idle state of the signal bus.

2. The apparatus of claim 1, wherein the electrical interface is a differential interface to a universal serial bus (USB).

3. The apparatus of claim 1, wherein the driver circuit is configured to drive the laser emitter with a first current level when detecting the first voltage, drive the laser emitter with a second current level when detecting the second voltage, and drive the laser emitter with a third current level when detecting the third voltage, wherein the third current level is intermediate the first and second current levels.

4. The apparatus of claim 3, wherein the driver circuit includes a first field effect transistor (FET), a second FET, and a third FET, wherein driver circuit is configured to: activate the first, second, and third FETs when detecting the first voltage level to sink the first current level from the laser emitter; activate only the first FET when detecting the second voltage level to sink the second current level from the laser emitter; and activate the first and second FETs when detecting the third voltage level to sink the third current level from the laser emitter.

5. The apparatus of claim 1, including: a photodiode configured to detect laser energy received across the air gap from the separate device, wherein the laser emitter and the photodiode are arranged on a single substrate.

6. The apparatus of claim 5, including a receiver circuit electrically coupled to the photodiode, wherein the receiver circuit includes a power monitor circuit configured to determine an average power of laser energy received across the air gap from the separate device, and generate an output voltage using a comparison of received laser energy to the determined average power of laser energy.

7. The apparatus of claim 5, including a processor circuit configured to communicate data with the separate device according to a USB protocol using the photodiode and laser emitter.

8. The apparatus of claim 7, wherein the processor circuit is configured to communicate data with the separate device according to a USB burst mode protocol using the photodiode and laser emitter, wherein the driver circuitry is configured to maintain the laser emitter at the third power level between bursts of data transmitted according to the USB burst mode protocol.

9. An apparatus comprising an optical interface, the optical interface including:
  an optical interface host side including a host-side laser emitter and host-side driver circuitry, wherein the host-side driver circuitry includes an electrical interface and is configured to detect voltage levels at the electrical interface including a first voltage level, a second voltage level, and a third voltage level; and drive the laser emitter at a first power level when detecting the first voltage level, drive the laser emitter at a second power level when detecting the second voltage level, and drive the laser emitter at a third power level intermediate the first and second power levels when detecting the third voltage level; and
  an optical interface peripheral side separated from the optical interface host side by an air space, the optical interface peripheral side including a peripheral-side photodiode and peripheral-side receiver circuitry, wherein the peripheral-side receiver circuitry includes a power monitor circuit configured to determine an average power of laser energy received across the air gap from the separate device, and generate an output voltage using a comparison of received laser energy to the determined average power of laser energy.

10. The apparatus of claim 9, further including: a peripheral-side laser emitter; peripheral-side driver circuitry; a host-side photodiode; and host-side receiver circuitry; wherein the host-side photodiode and host-side laser emitter are arranged on a first substrate and the peripheral-side photodiode and peripheral-side laser emitter are arranged on a second substrate.

11. The apparatus of claim 10, including a host processor circuit electrically coupled to the optical interface host side, wherein the processor circuit is configured to initiate transmission of pulses of laser energy by the host-side laser emitter according to a duplex communication protocol.

12. The apparatus of claim 9, wherein the electrical interface of the host-side driver circuitry is an interface to a signal bus, and the first voltage level corresponds to a first logic level of the signal bus, the second voltage level corresponds to a second logic level of the signal bus, and the third voltage level corresponds to an idle state of the signal bus.

13. The apparatus of claim 12, wherein the electrical interface is a differential interface to a universal serial bus (USB).

14. The apparatus of claim 9, wherein the host-side driver circuitry is configured to drive the laser emitter with a first current level when detecting the first voltage, drive the laser emitter with a second current level when detecting the second voltage, and drive the laser emitter with a third current level when detecting the third voltage, wherein the third current level is intermediate the first and second current levels.

15. The apparatus of claim 14, wherein the host-side driver circuitry includes a first field effect transistor (FET), a second FET, and a third FET, and the driver circuitry is configured to: activate the first, second, and third FETs when detecting the first voltage level to sink the first current level from the laser emitter; activate only the first FET when detecting the second voltage level to sink the second current level from the laser emitter; and activate the first and second FETs when detecting the third voltage level to sink the third current level from the laser emitter.

16. A method of operating an optical interface, the method comprising:
  detecting voltage levels at an electrical bus interface of a first device, the voltage levels including a first voltage level, a second voltage level, and a third voltage level;
  wherein the first voltage level corresponds to a first logic level of the signal bus, the second voltage level corresponds to a second logic level of the signal bus, and the third voltage level corresponds to an idle state of the signal bus; and
  transmitting laser energy using an optical interface of the first device across an air gap to a second device, wherein the transmitting includes driving a laser emitter at a first power level when detecting the first voltage level, driving the laser emitter at a second power level when detecting the second voltage level, and driving the laser emitter at a third power level intermediate the first and second power levels when detecting the third voltage level.

17. The method of claim 16, including:
  detecting transmitted laser energy at the second device;
  determining average power level of the detected laser energy;
  determining a logic level of subsequently detected laser energy by comparing a power level of the subsequently detected laser energy to the determined average power; and
  generating an output voltage at the second device according to the determined logic level.

18. The method of claim 16, wherein detecting voltage levels includes detecting differential voltage levels at a universal serial bus (USB) interface of the first device.

19. The method of claim 18, wherein the transmitting the laser energy includes transmitting the laser energy according to a USB protocol burst mode.

\* \* \* \* \*